(12) United States Patent
Lapstun et al.

(10) Patent No.: US 7,533,816 B2
(45) Date of Patent: May 19, 2009

(54) METHOD OF ASSOCIATING AUDIO WITH A POSITION ON A SURFACE

(75) Inventors: Paul Lapstun, Balmain (AU); Kia Silverbrook, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 0 days.

(21) Appl. No.: 11/866,313

(22) Filed: Oct. 2, 2007

(65) Prior Publication Data

US 2008/0017713 A1    Jan. 24, 2008

Related U.S. Application Data

(63) Continuation of application No. 11/839,494, filed on Aug. 15, 2007, which is a continuation of application No. 09/722,141, filed on Nov. 25, 2000, now Pat. No. 7,263,270.

(51) Int. Cl.
*G06K 7/10* (2006.01)
(52) U.S. Cl. .......................... 235/454; 386/46
(58) Field of Classification Search ............... 235/454, 235/494; 386/69
See application file for complete search history.

(56) References Cited

U.S. PATENT DOCUMENTS

| | | | |
|---|---|---|---|
| 4,864,618 A | 9/1989 | Wright et al. | |
| 5,051,736 A | 9/1991 | Bennett et al. | |
| 5,418,622 A | 5/1995 | Takeuchi | |
| 5,452,097 A | 9/1995 | Koga et al. | |
| 5,477,012 A | 12/1995 | Sekendur | |
| 5,541,738 A | 7/1996 | Mankovitz | |
| 5,652,412 A | 7/1997 | Lazzouni et al. | |
| 5,661,506 A | 8/1997 | Lazzouni et al. | |
| 5,692,073 A | 11/1997 | Cass | |
| 5,852,434 A | 12/1998 | Sekendur | |
| 6,076,734 A | 6/2000 | Dougherty et al. | |
| 6,097,441 A | 8/2000 | Allport | |
| 6,104,334 A | 8/2000 | Allport | |
| 6,137,950 A | 10/2000 | Yuen | |
| 6,407,779 B1 | 6/2002 | Herz | |

(Continued)

FOREIGN PATENT DOCUMENTS

EP    0697793 A    2/1996

(Continued)

OTHER PUBLICATIONS

Dymetman, M., and Copperman, M., "Intelligent Paper in Electronic Publishing, Artist Imaging, and Digital Typography, Proceedings of EP '98", Mar./Apr. 1998, Springer Verlag LNCS 1375, pp. 392-406.

*Primary Examiner*—Daniel A Hess

(57) ABSTRACT

A method of enabling recorded video to be associated with a location on a surface is provided. The surface has coded data printed thereon, which is indicative of a plurality of locations on the surface. The method comprises the steps of: interacting with the surface using an optical sensing device comprising a video camera; recording video using the video camera; reading some of the coded data during the interaction; determining a position of the sensing device using the read coded data; and communicating, to a computer system, position data indicative of the position of the sensing device and video data corresponding to the recorded video, thereby enabling the computer system to associate the video data with the position.

19 Claims, 12 Drawing Sheets

U.S. PATENT DOCUMENTS

| | | |
|---|---|---|
| 6,437,836 B1 | 8/2002 | Huang et al. |
| 6,759,967 B1 | 7/2004 | Staller |
| 6,781,635 B1 | 8/2004 | Takeda |
| 6,964,374 B1 | 11/2005 | Djuknic et al. |
| 2003/0190145 A1 * | 10/2003 | Copperman et al. ........... 386/69 |
| 2004/0093352 A1 | 5/2004 | Matsumoto |
| 2004/0168187 A1 | 8/2004 | Chang |
| 2004/0226042 A1 | 11/2004 | Ellis |

FOREIGN PATENT DOCUMENTS

| | | |
|---|---|---|
| EP | 0856812 A | 8/1998 |
| EP | 0969390 | 1/2000 |
| GB | 2306669 A | 5/1997 |
| JP | 02-252154 A | 10/1990 |
| WO | WO 95/17794 | 6/1995 |
| WO | WO 99/18487 A2 | 4/1999 |
| WO | WO 99/45521 A | 9/1999 |
| WO | WO 99/50787 A1 | 10/1999 |

* cited by examiner

METHOD OF ASSOCIATING AUDIO WITH A POSITION ON A SURFACE

CROSS REFERENCE TO RELATED APPLICATION

This application is a continuation of U.S. application Ser. No. 11/839,494 filed Aug. 15, 2007, which is a continuation of U.S. application Ser. No. 09/722,141 filed Nov. 25, 2000, now issued U.S. Pat. No. 7,263,270, all of which are herein incorporated by reference.

FIELD OF INVENTION

The present invention relates to devices for receiving machine-readable input and for outputting a human discernable output, usually in the form of audio or visual information. More particularly the invention relates to an video player which may be used to scan or sense machine-readable coded data on a surface and to output a still image, a video clip or audio material, or both audio and visual material.

CROSS REFERENCE TO OTHER RELATED APPLICATIONS

Various methods, systems and apparatus relating to the present invention are disclosed in the following co-pending applications/granted patents filed by the applicant or assignee of the present invention with the parent application Ser. No. 11/839,494.

| | | | | | |
|---|---|---|---|---|---|
| 6530339 | 6631897 | 7295839 | 09/722174 | 7175079 | 7064851 |
| 6826547 | 6741871 | 6927871 | 6980306 | 6965439 | 6788982 |
| 7263270 | 6788293 | 6946672 | 7091960 | 6792165 | 7105753 |
| 7182247 | | | | | |

The disclosures of these co-pending applications are incorporated herein by cross-reference.

Various methods, systems and apparatus relating to the present invention are disclosed in the following co-pending applications filed by the applicant or assignee of the present invention on 20 Oct. 2000:

| | | | | | |
|---|---|---|---|---|---|
| 7190474 | 7110126 | 6813558 | 6965454 | 6847883 | 7131058 |
| 09/693690 | 6982798 | 6474888 | 6627870 | 6724374 | 09/693514 |
| 6454482 | 6808330 | 6527365 | 6474773 | 6550997 | |

The disclosures of these co-pending application are incorporated herein by cross-reference.

Various methods, systems and apparatus relating to the present invention are disclosed in the following co-pending applications filed by the applicant or assignee of the present invention on 15 Sep. 2000:

| | | | |
|---|---|---|---|
| 6679420 | 6963845 | 6995859 | 6720985 |

The disclosures of these co-pending applications are incorporated herein by cross-reference.

Various methods, systems and apparatus relating to the present invention are disclosed in the following co-pending applications filed by the applicant or assignee of the present invention on 30 Jun. 2000:

| | | | | | |
|---|---|---|---|---|---|
| 6824044 | 6678499 | 6976220 | 6976035 | 6766942 | 09/609303 |
| 6922779 | 6978019 | 09/607843 | 6959298 | 6973450 | 7150404 |
| 6965882 | 7233924 | 7007851 | 6957921 | 6457883 | 6831682 |
| 6977751 | 6398332 | 6394573 | 6622923 | | |

The disclosures of these co-pending applications are incorporated herein by cross-reference.

Various methods, systems and apparatus relating to the present invention are disclosed in the following co-pending applications filed by the applicant or assignee of the present invention on 23 May 2000:

| | | | | | |
|---|---|---|---|---|---|
| 6428133 | 6526658 | 6315399 | 6338548 | 6540319 | 6328431 |
| 6328425 | 6991320 | 6383833 | 6464332 | 6390591 | 7018016 |
| 6328417 | 09/575197 | 7079712 | 6825945 | 09/575165 | 6813039 |
| 6987506 | 7038797 | 6980318 | 6816274 | 7102772 | 09/575186 |
| 6681045 | 6728000 | 7173722 | 7088459 | 09/575181 | 7068382 |
| 7062651 | 6789194 | 6789191 | 6644642 | 6502614 | 6622999 |
| 6669385 | 6549935 | 6987573 | 6727996 | 6591884 | 6439706 |
| 6760119 | 09/575198 | 6290349 | 6428155 | 6785016 | 6870966 |
| 6822639 | 6737591 | 7055739 | 7233320 | 6830196 | 6832717 |
| 6957768 | 09/575172 | 7170499 | 7106888 | 7123239 | 6409323 |
| 6281912 | 6604810 | 6318920 | 6488422 | 6795215 | 7154638 |
| 6859289 | | | | | |

The disclosures of these co-pending applications are incorporated herein by cross-reference.

BACKGROUND

Purpose-specific devices such as televisions, video cassette player/recorders and camcorders, as well as more general-purpose devices such as personal computers, can be used to play back video material such as movies. Many of these devices can also be used to record video material, such as home movies.

In general, these devices don't provide access to situated video, e.g. to a video clip associated with a concert poster encountered at a train station, or a demonstration video associated with a page in a workshop manual. Each device must be used to seek out the desired video material through a virtual space accessible through the device, or the video material must be brought to the device in a device-compatible physical format.

The present invention utilizes methods, systems and devices related to a system referred to as "netpage", described in our co-pending applications listed above, wherein invisible coded data is disposed on various surfaces to render the surfaces interactive in the manner of graphical user interfaces to computer systems.

SUMMARY OF INVENTION

In one broad form the invention provides a hand-held video player with one or more sensors capable of sensing images including coded data. Images including coded data are sensed by the viewer and decoded. The decoded information is transmitted to a computer system which associates the decoded data with video data stored on the system, using previously stored association data. The data is transmitted to the viewer and to the user on a display screen.

Accordingly, in one broad form, the invention provides a video player including:

at least one sensor for sensing coded data on or in a substrate and for generating first data;

a transmitter for transmitting said first data or second data at least partially based on the first data to a computer system;

a receiver for receiving video data associated with an identity derived from the first data from the computer system;

at least one display device for outputting an visual display based at least partially on the video data.

The player preferably includes a touch screen and the visual output includes interactive elements by which the user may modify the visual output by interaction with the touch screen.

The player may also include memory into which a file or files are downloaded for subsequent viewing.

A video player according to one embodiment of the present invention is a compact device which, when used to click a video clip object or hyperlink on a page including machine readable code, plays back the associated video clip. It contains a sensor for reading the machine readable code, a transceiver for communicating with a base station, a compressed video and audio decoder, a color display, a display controller, an audio digital-to-analog converter, a small audio amplifier, a speaker, a stereo headphone socket, a volume control potentiometer, and a controlling processor. It also typically contains playback controls such as stop, play/pause, skip back, skip forward, although these may alternatively be provided in printed form on a coded substrate. Video clip information, such as title, chapter number, playing time, and pause status, is shown transiently on the color display, superimposed on the video.

When the user touches the video player to a video clip object or hyperlink on a coded page, the player senses the page via its page sensor, and decodes the link in the usual way via the base station. It then streams the video from the page network via the base station, subject to the user's interaction with the playback controls.

Audio is routed to the speaker, or, if a plug is present in the stereo headphone socket, to the attached headphones or other external audio device. Audio may also be routed to wireless headphones via the transceiver, either directly from the base station or via the player.

The video player may operate out-of-range of a netpage base station if it is configured to utilize an embedded mobile telephone transceiver, or if it is itself embedded in a mobile telephone which it is configured to interoperate with.

DETAILED DESCRIPTION OF PREFERRED AND OTHER EMBODIMENTS

Figure 1:
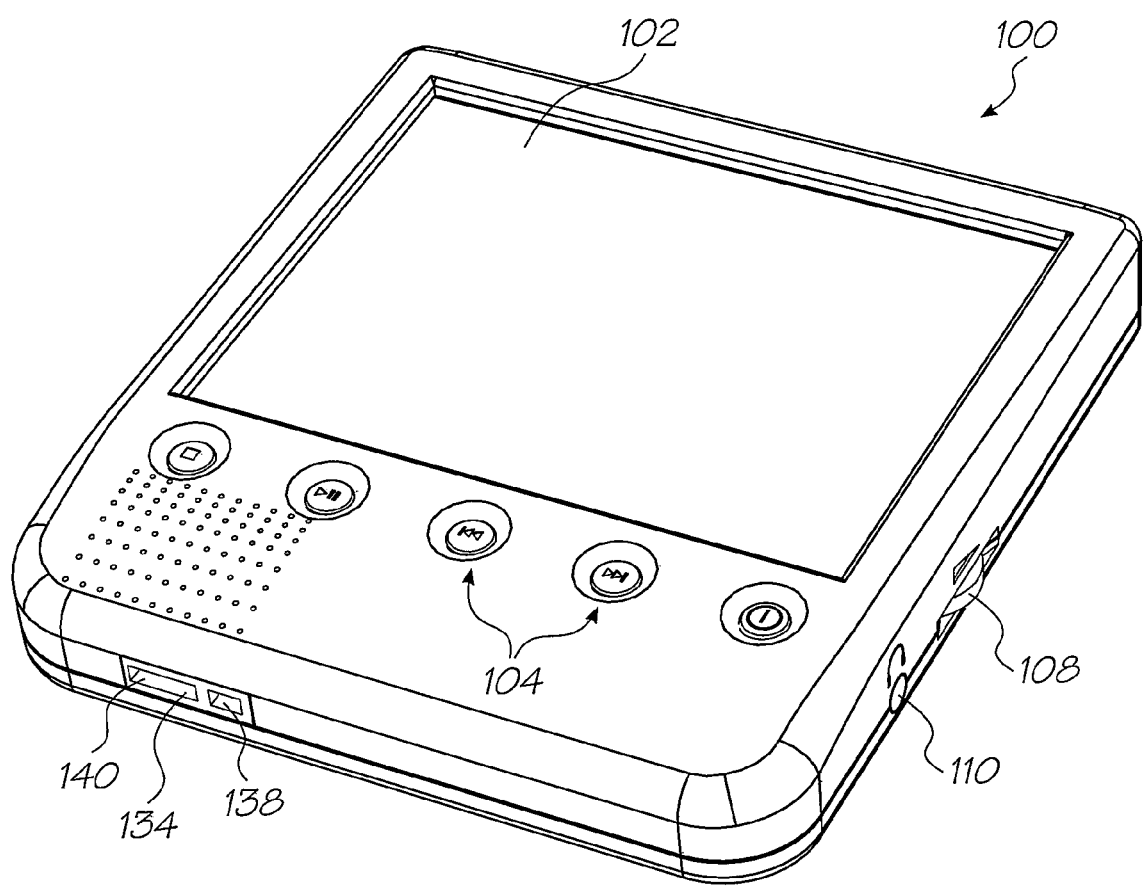
FIG. 1 is a perspective view from above of video player according to an embodiment of the invention.
Figure 2:
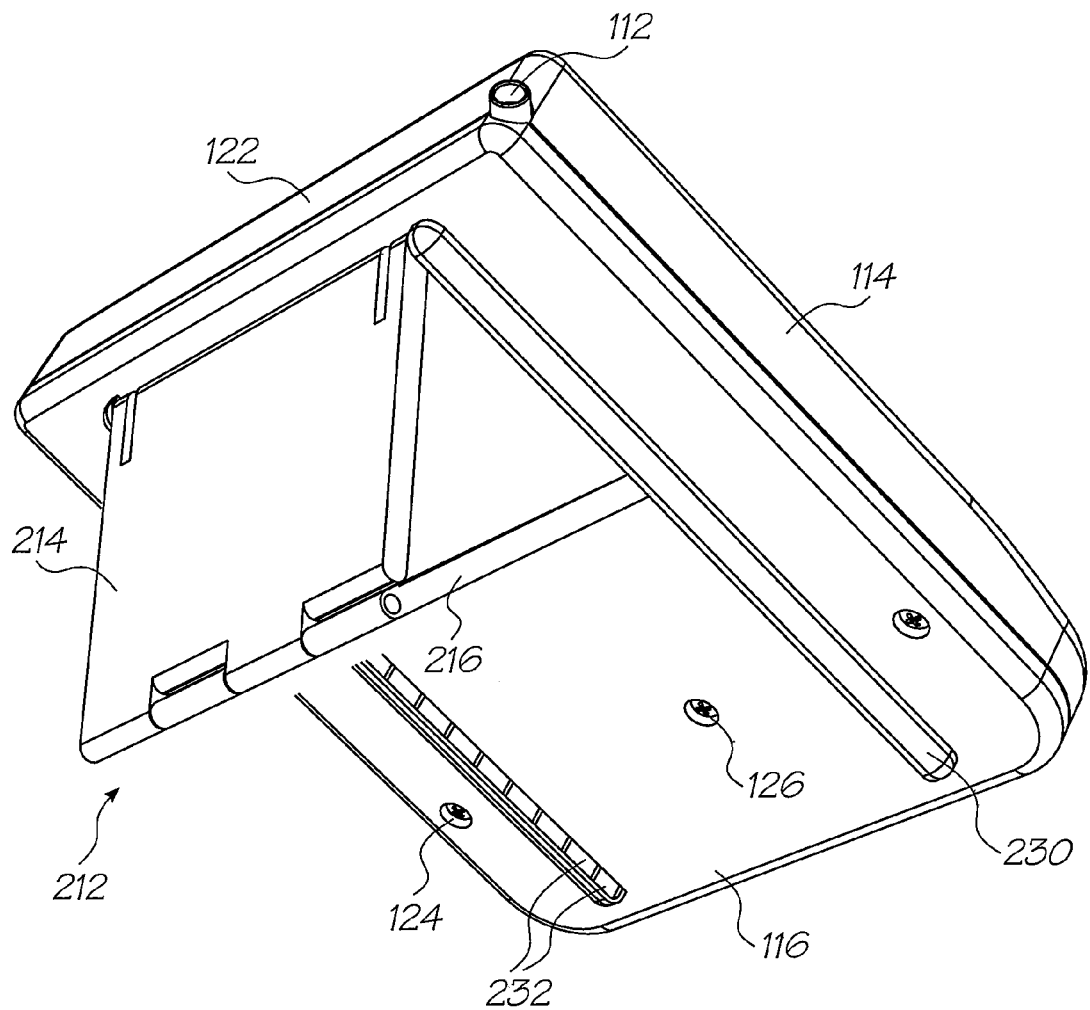
FIG. 2 is a perspective view from below of the FIG. 1 player.
Figure 3:
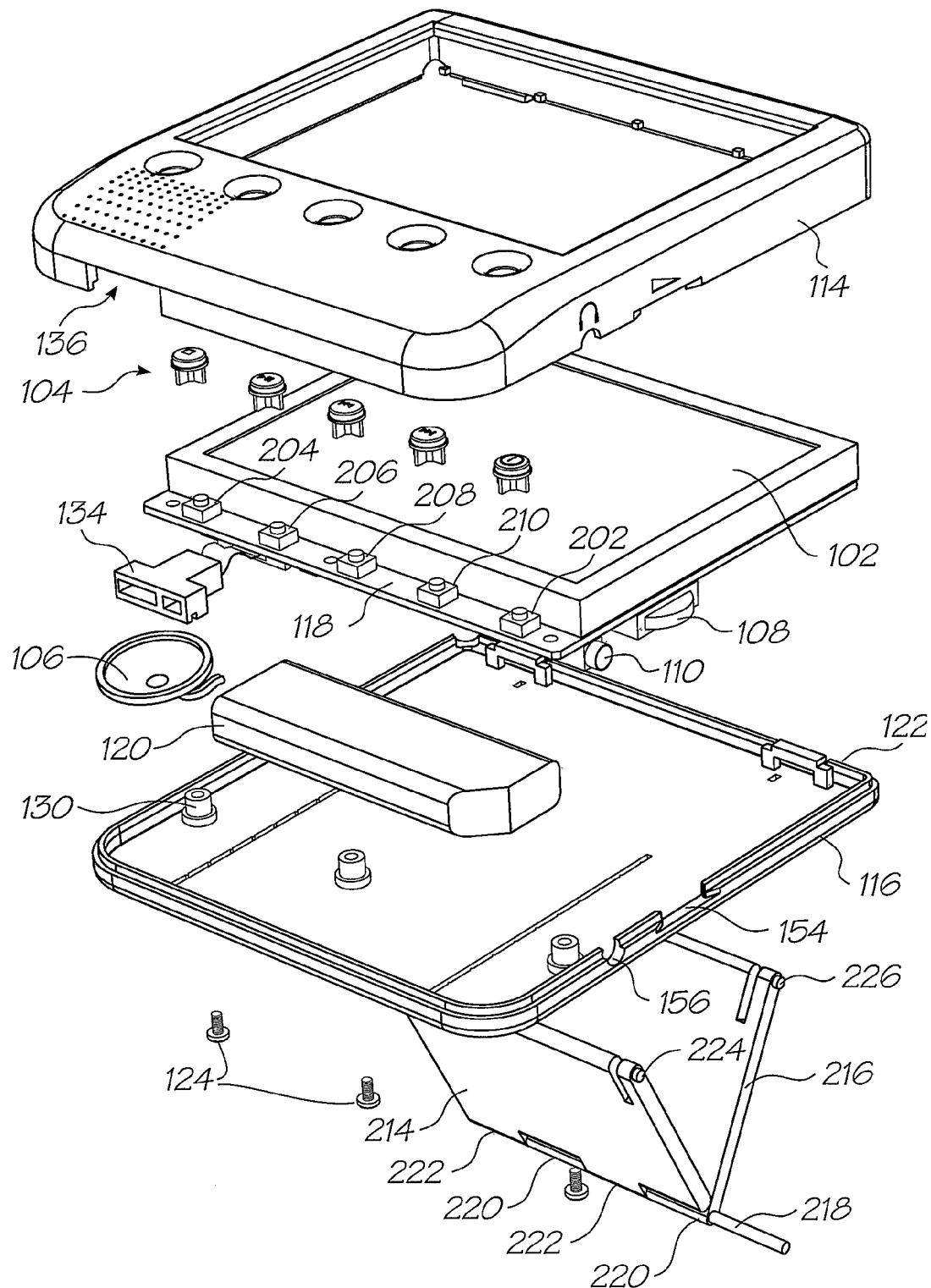
FIG. 3 is an exploded perspective view from above of the FIG. 1 player.
Figure 4:
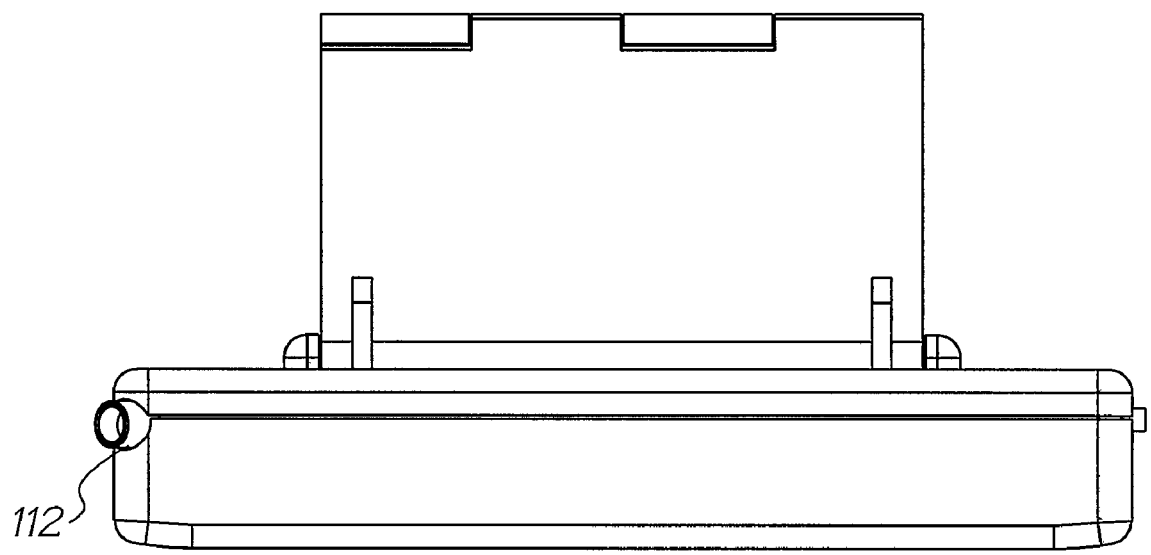
FIG. 4 is a side view from the rear of the player of FIG. 1.
Figure 5:
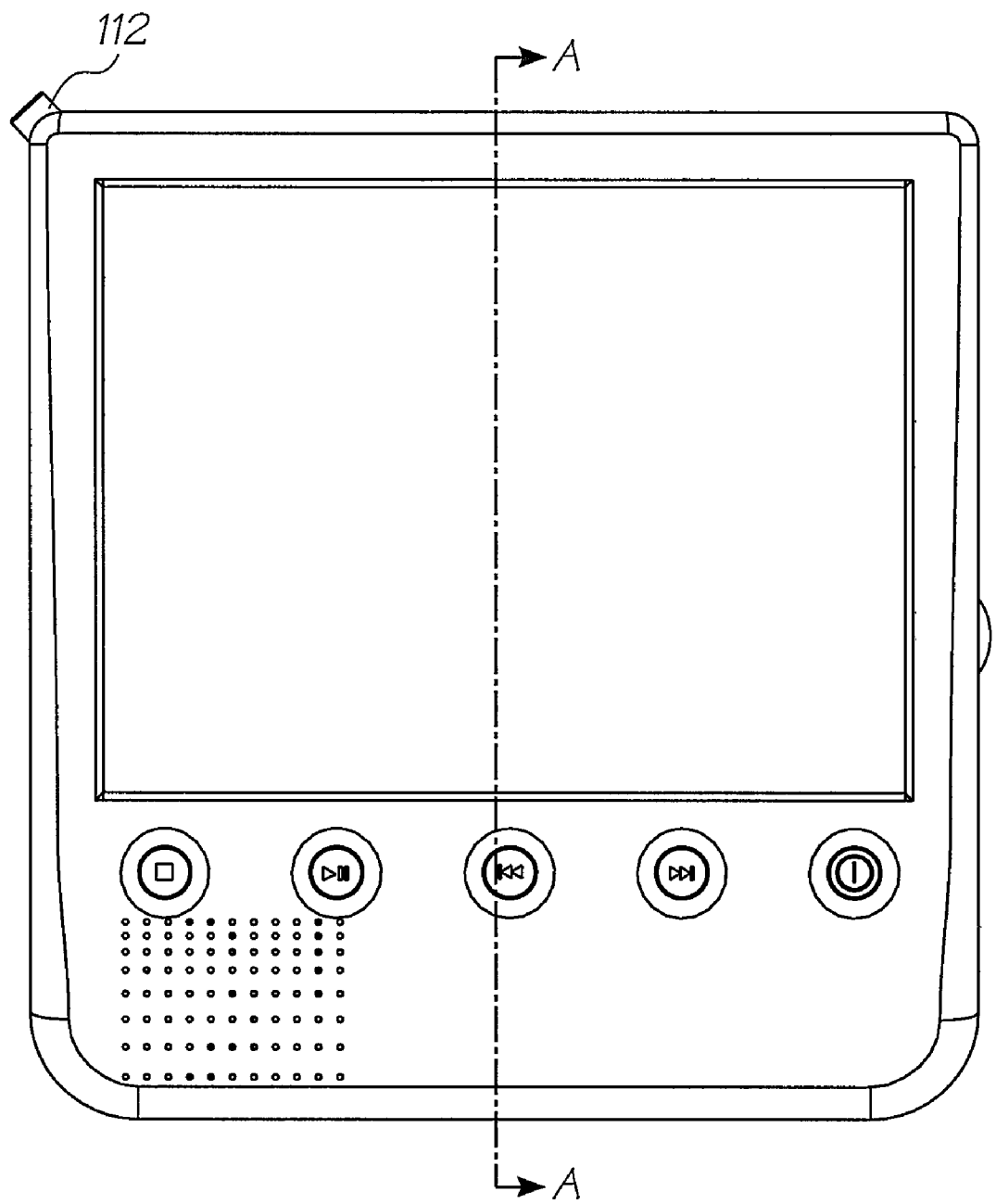
FIG. 5 is a plan view from above of the FIG. 1 player.
Figure 6:
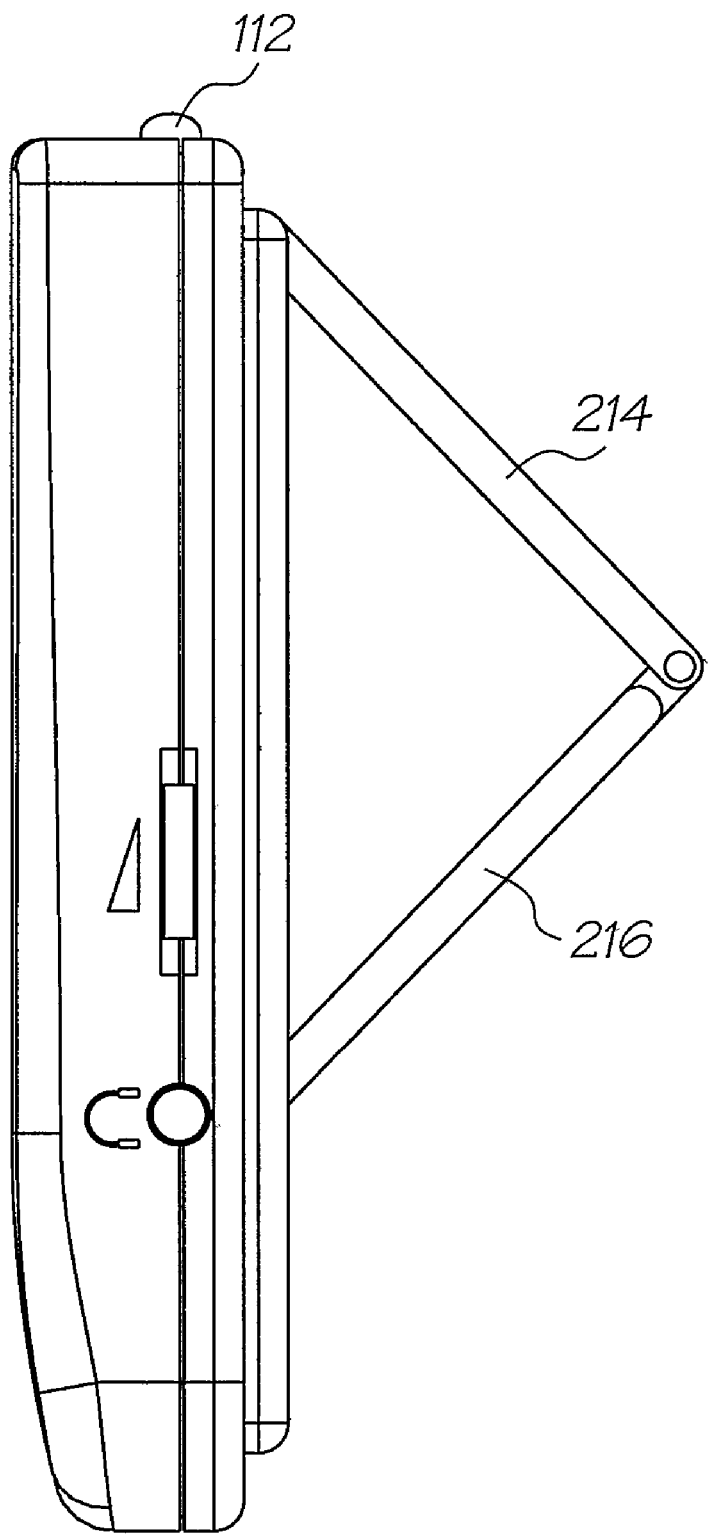
FIG. 6 is a side view from the right of the FIG. 1 player.
Figure 7:
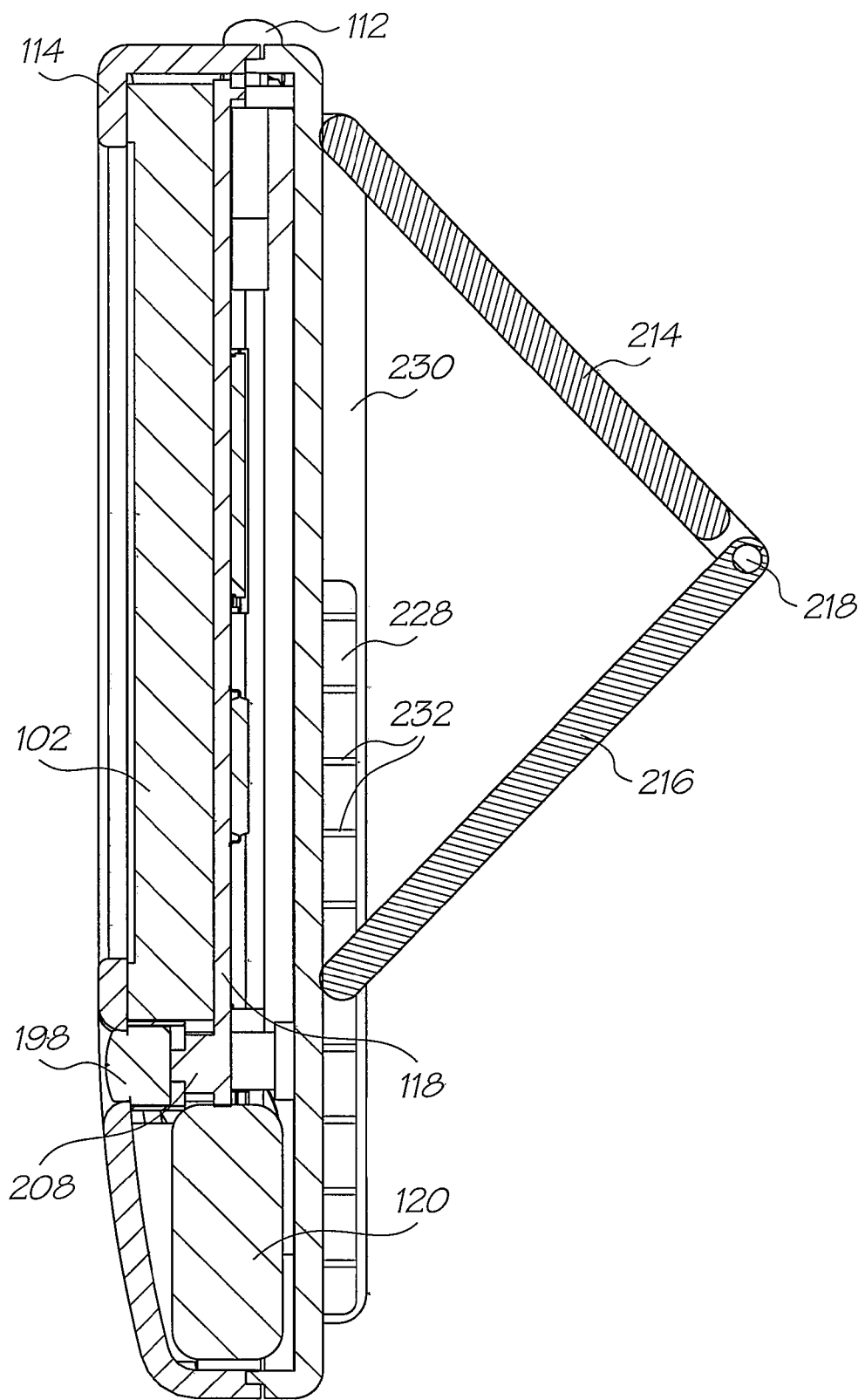
FIG. 7 is a cross-sectional view taken along line AA of FIG. 5.
Figure 8:
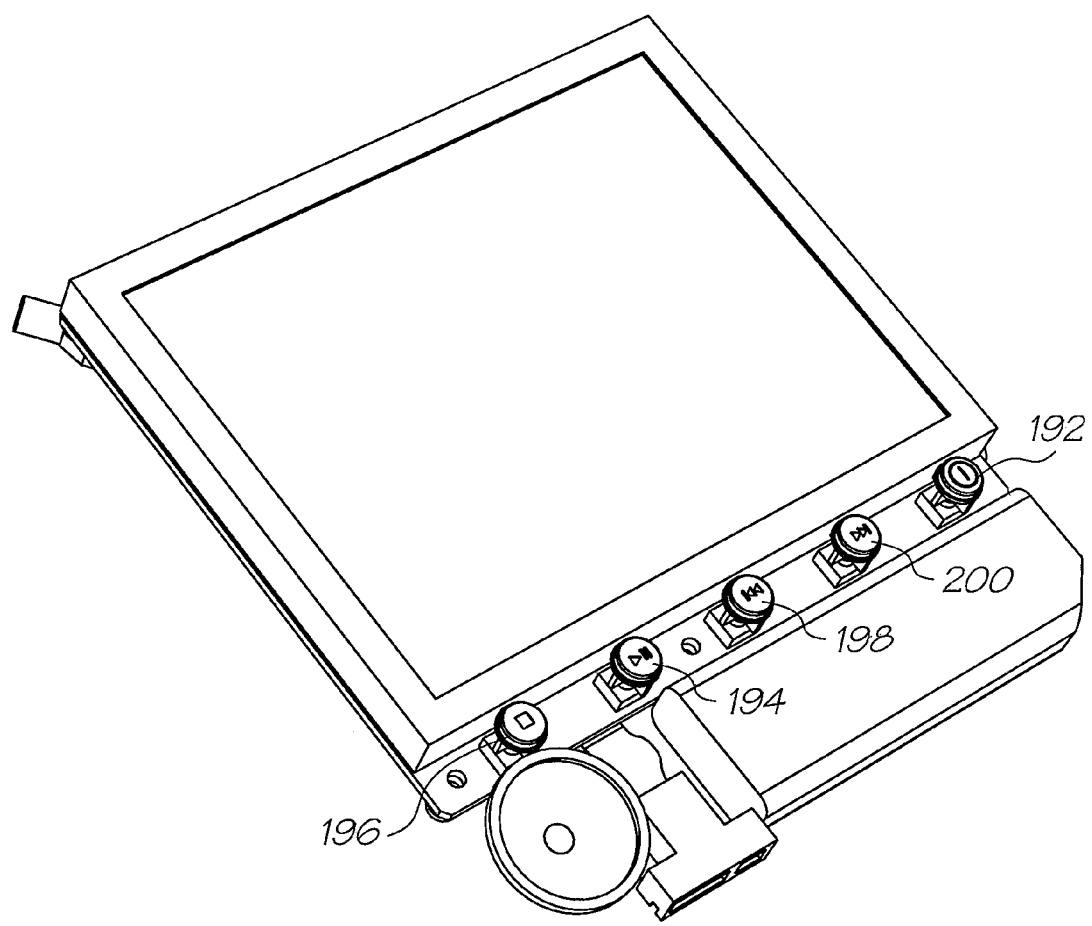
FIG. 8 is a perspective view from above of the internal components of the FIG. 1 player.
Figure 9:
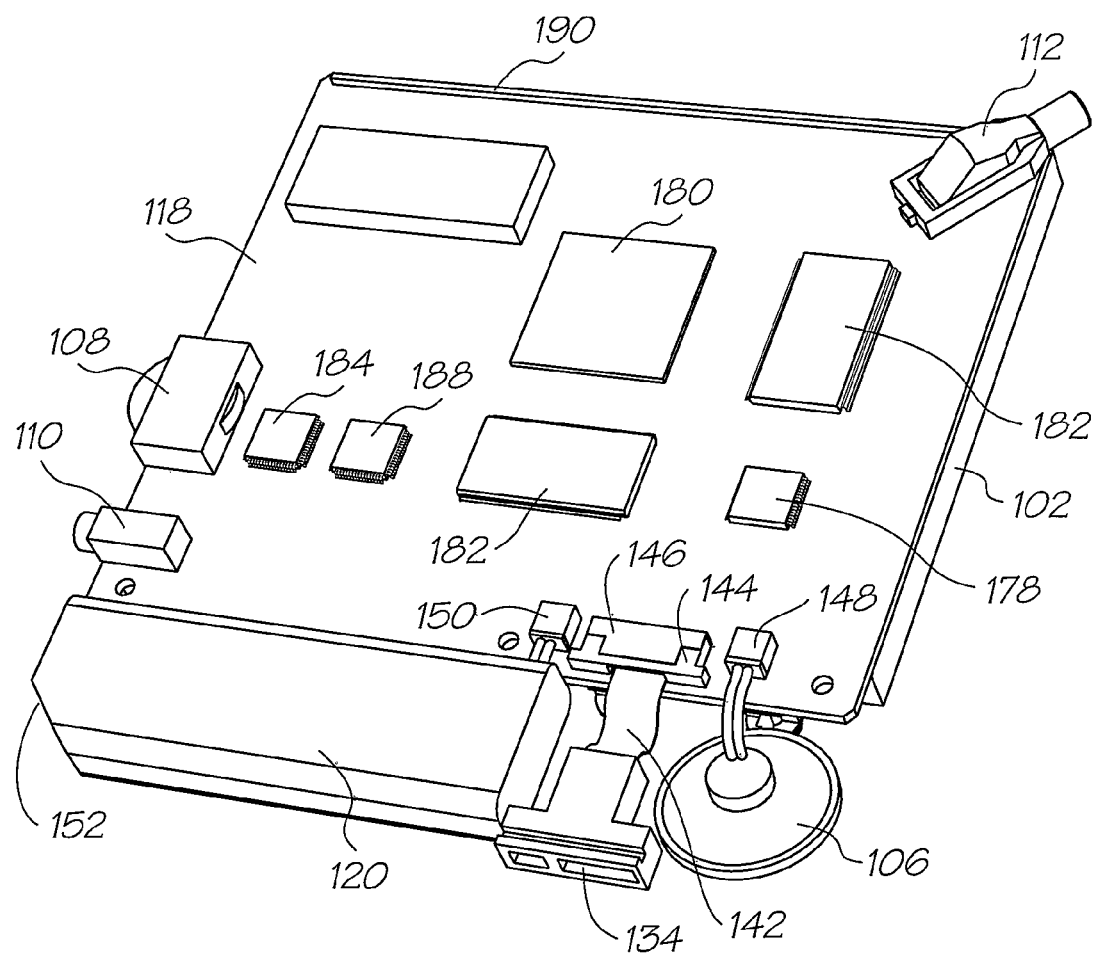
FIG. 9 is a perspective view from below of the internal components of the FIG. 1 player.
Figure 10:
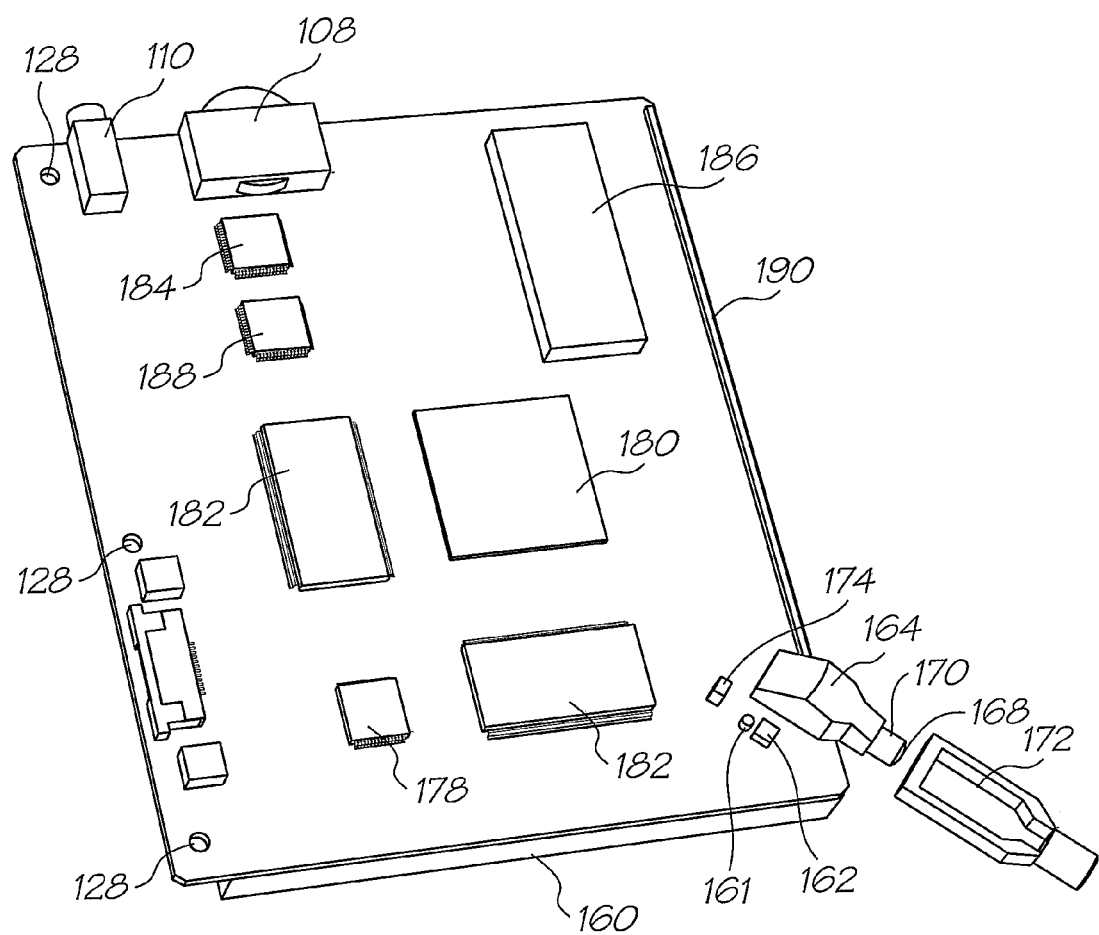
FIG. 10 is an exploded perspective view of the underside of the PCB of the FIG. 1 player.

Referring to the drawings, there is shown a display unit 100. The display unit has a color LCD screen 102, five control buttons 104, a speaker 106, volume control 108, an audio out jack 110 and a infrared sensor device 112.

The body of the player is formed of upper and lower moldings 114 and 116 respectively which encapsulate a PCB 118 and all of the electronic components are mounted on or connected to this PCB. Power for the player is supplied by a rechargeable 3 volt lithium ion battery 120. The battery is not user replaceable and is located within the body. The two moldings 114 and 116 clip together at the upper edge 122 and are held together by three screws 124 extending through apertures 126 in the lower molding to engage in threaded studs (not shown) in the upper molding 114. The screws pass through holes 128 in the PCB and sandwich the PBC between lower bosses 130 formed in the lower molding 116 and the studs in the upper molding 114.

The LCD screen 102 is mounted on the top of the PCB and is preferably a full color thin film transistor type display, or a display having similar or better contrast and switching speeds; such displays allow video to be played at acceptable qualities. The video player may include a touch screen overlay 132.

A combined data and power connector 134 is connected to the PCB and is accessible via opening 136 in the body. The connector 134 includes a power input socket 138 for recharging of the battery 120 and a data socket 140 for input/output of data to and from the player. The connector 134 is connected to the PCB via a flexible PCB 142 and connectors 144 and 146.

The speaker 106 is also connected to the PCB at its lower edge via connector 148 and is positioned between the PCB and the lower edge of the body. The speaker may be hard wired to the PCB rather than being provided with a removable connector. The audio output is used to play audio associated with the video, and optionally to provide operating feedback to the user.

The battery 120 is also positioned between the PCB and the lower edge of the body. A removable connector 150 is provided to connect the battery to the PCB. However, since the battery is not intended to be user replaceable, a permanent connection may be used. The battery is preferably shaped to fit the body and accordingly has a beveled corner 152.

The volume control 108 and audio out jack 110 are mounted directly on the right hand side of the PCB and are accessible via openings 154 and 156 respectively in the right hand side of the body.

The PCB also includes a compressed audio visual decoder 178, processor chip 180, dynamic RAM (DRAM) 182, flash or ROM 184, display controller 250 for controlling the LCD, a transceiver chip 188 and an aerial 190.

Mounted on the lower surface of the PCB, at the top left hand corner, is the sensor device 112 which is capable of detecting infrared markings on a substrate. The sensor device 112 comprises a LED 160 and an image sensor 162. The image sensor 162 is sensitive to infrared light, either inherently or by use of filters and the LED 160 emits infrared light, again inherently or by use of filters. In use infrared light is emitted from the LED 160 and passed through an light guide 164 and then through an aperture 166 in the body formed by the two casings 114 & 116. Light passes through the aperture 166, the optical molding 164 in the lower molding. Light passes through the aperture 166, the optical molding 164 and is focused onto the image sensor 162. The optical molding preferably includes a lens 168 and may include a beam splitter/combiner to allow light from and to the LED and the image sensor to follow the same path.

The infrared LED 160 may be strobed in synchrony with image capture to prevent motion-blurring of captured tag images. The image sensor typically consists of a 200×200 pixel CMOS or CCD image sensor with a near-infrared bandpass filter.

The free end portion 170 of the light guide 164 is cylindrical and a force sensor collar 172 is slideably mounted on the cylindrical portion. The collar extends beyond the free end of portion 170 so that when the player is pushed against the surface the collar rather than the lens 168 contacts the surface. The collar has a limited amount of movement so that when pressed against a surface there will be a small gap between the surface and the lens 168. The lens 168 is designed to have the surface in focus at most orientations of the player to the surface; it will be appreciated that with different contact angles the distance will change and so the depth of field of focus needs to encompass this range.

The collar 172 extends around and behind the sensor device 112 and engages a micro switch 174. The micro switch is biased to an open position; pushing on the collar against the micro switch 174 overcomes the biasing means in the switch 174 and closes it. When the force is removed the biasing means urges the collar outward and opens the switch again. A separate biasing means may be provided external of the switch 174 in addition to the micro switch's own biasing means. The sensor device is capable of detecting infrared absorptive tags, such as net page tags. For a full description of the electronic processes involved, reference is made to our co-pending application U.S. Ser. No. 09/721,893, now issued U.S. Pat. No. 6,792,165, referred to earlier. The CCD 162, the LED 160 and processing functions incorporated in the processor chip 180 are similar to those disclosed in the co-pending application.

The player is thus capable of sensing and decoding netpage tags on a substrate. Image data captured by the CCD 162 is sent to the processor chip 180 and decoded to a region ID (or page ID) and a tag ID. The region ID and tag ID, together with other necessary information, is transmitted to the netpage system via the transceiver chip 188 and aerial 190. The netpage system resolves the region ID and tag ID to corresponding document data which it transmits back to the player. This is received by the processor 180 via the transceiver. The renders the data for display on the LCD 102 via the display controller 250.

Component digital video for standard-definition television (SDTV) is sampled at 720 active luminance samples and 360 active chrominance (red and blue color difference) samples per line, with about 488 active lines per frame in 525/59.94 systems and 576 active lines per frame in 625/50 systems. 525/59.94 systems have a frame rate of 29.97 Hz, corresponding to an interlaced field rate of 59.94 Hz, while 625/50 systems have a frame rate of 25 Hz, corresponding to an interlaced field rate of 50 Hz. With 8-bit sampling per component, i.e. 16 bits per pixel at the luminance sampling rate, both systems have a data rate of about 21 Mbytes/s. This is somewhat lower than the data rate implied by the 13.5 MHz luminance sample rate, since each line contains inactive samples and each frame contains inactive lines. Component digital video for SDTV is known as 4:2:2, in reference to the ratios of its luminance and chrominance sampling rates to a base frequency of 3.375 MHz.

In 4:2:0 video, chrominance is also subsampled by a factor of two with respect to luminance in the vertical dimension, giving 12 bits per pixel at the luminance sampling rate, and a data rate of about 16 Mbytes/s. 4:2:0 is commonly used in JPEG and MPEG compression, discussed below.

Video is also commonly sampled at, or subsampled to, 360 (352) luminance samples per line and 240 lines per frame (in 525/59.94) or 288 lines per frame (in 625/50), particularly in low-rate versions of MPEG and related video compression standards, giving a data rate of about 4.8 Mbytes/s. The MPEG variant is referred to as SIF (Standard Interchange Format), while the International Telecommunications Union's videoconferencing variant is referred to as CIF (Common Intermediate Format). The square-pixel equivalent is normally taken to be 320×240.

For both storage and communications purposes, there is a strong imperative to compress a digital video stream. In the JPEG still image compression standard, blocks of an image are transformed into the frequency domain via a discrete cosine transform (DCT). This has the effect of concentrating image energy in relatively lower-frequency coefficients, allowing higher-frequency coefficients to be more crudely quantized, the principal source of compression in JPEG. At compression ratios at 10:1 and below, JPEG introduces negligible image degradation. In the MPEG video compression standard, periodic reference frames are coded using a scheme similar to JPEG, to support random access. Remaining frames are coded using local block-based motion vectors, with reference to an earlier frame or to an earlier frame and a future frame.

The MPEG-1 compression standard, targeted at the 1.5 Mbit/s data rate of compact discs, is generally credited with achieving the same quality as VHS tapes at a bit rate of 1.2 Mbit/s, when operating at SIF resolution at 30 Hz non-interlaced.

Digital audio is usually sampled at 44.1 kHz, i.e. at twice the 22.05 kHz upper cutoff frequency of the 25th critical band of human hearing. Slightly higher sampling frequencies, such as 48 kHz, are sometimes used because in reality it is impractical to lowpass filter the audio with a sharp cutoff at 22.05 kHz prior to sampling. With typical quantization of 16 bits per channel, a stereo signal therefore generates 1.41 Mbit/s, and this is consequently the data rate of many common digital audio applications, including, for example, the audio compact disc (if error correction overhead is ignored).

Because the typical 1.41 Mbit/s digital audio data rate is non-trivial, there is a strong incentive to also compress the digital audio signal. The most successful digital audio compression schemes have a perceptual basis, i.e. they exploit the frequency-dependence of the threshold of human hearing, and signal-dependent masking, whereby a relatively louder tone can locally raise the threshold curve and thus mask relatively softer adjacent tones. Audio compression also typically relies on traditional compression techniques such as entropy-coding. In multi-channel audio, inter-channel redundancy is also commonly exploited.

The MPEG Audio Layer 3 (MP3) standard uses perceptual coding to achieve 'near-CD' and 'CD' quality reproduction at compression ratios of between 16:1 and 12:1, i.e. reducing the data rate from 1.41 Mbit/s to between 88 Kbit/s and 118 Kbit/s.

The player includes a dedicated compressed video and audio decoder 178 which produces square-pixel progressive-scan digital video and digital audio output. For example, to handle MPEG-1 encoded video and audio, a video and audio decoder similar to a C-Cube CL680 decoder may be used. To handle MPEG-2 encoded video and audio, a video and audio decoder similar to C-Cube's ZiVA-3 decoder may be used. An MPEG-1 decoder typically uses a 4 Mbit DRAM during decoding, while an MPEG-2 decoder typically uses a 16 Mbit SRAM during decoding. The decoder memory 179 may be dedicated to the decoder, or may be part of a memory 182 shared with the processor.

Any of a number of other video and audio encoding standards may be supported via suitable video and audio decoders, including RealNetworks' RealVideo.

Digital video decompressed by the decoder is displayed on the color display 102 via a display controller 250.

Digital audio decompressed by the decoder is converted to analog via a digital-to-analog converter (DAC) 183, is amplified by an amplifier 185 subject to the volume control, and is output to a speaker 106 or to an external audio device via an audio jack 110. The speaker 106 is disabled when the audio jack is in use.

The processor chip contains a processor unit 181 which controls and coordinates the various electronic components of the player. The processor unit 181 executes software which monitors, via the tag sensor 162, the identity of the underlying page and the position of the player relative to the page; communicates the identity and position data to the netpage base station via a wireless transceiver 188; receives video clip information and streaming audio data from the base station via the transceiver 188; displays clip information to the status display 102; decompresses streaming audio data to the audio output via the audio decoder 183; and interprets user input captured via the user interface buttons 104. The embedded software executed by the processor is stored in the non-volatile memory 184, typically in the form of ROM and/or flash memory. Identity information unique to the player, as well as communications encryption keys, are also stored in non-volatile memory. During execution the processor utilizes faster volatile memory, typically in the form of a 64 Mbit (8 Mbyte) dynamic RAM (DRAM).

Assuming a compressed video data rate of 1.2 Mbit/s (e.g. MPEG-1 SIF at 30 Hz), the player's memory 182 can hold about one minute of compressed video (including stereo audio). With higher compression ratios or more memory, correspondingly longer clips can be held. If streaming playback is used by the player, then only a small video buffer is required to eliminate transmission jitter, and a significantly smaller memory may be used.

The processor unit 181 communicates with the other components via a shared bus 187. The processor unit 181, the bus 187, and any number of other components may be integrated into a single chip. As indicated in the block diagram, the integrated components may include the digital transceiver controller 189, the video decoder interface 191, and the tag image sensor interface 193. A parallel interface 195 is interposed between the bus 187 and the buttons 104, LED 160, touch sensor 132 and contact switch 174 In a more highly integrated chip, they may also include the video decoder 178, the audio DAC 183, the tag image sensor 162, and the memory 182. The analog radio transceiver 188 is unlikely to be integrated in the same chip, but may be integrated in the same package.

Since the player incorporates a dedicated video/audio decoder 178, the processor unit 181 only needs to be powerful enough to control and coordinate the other components. Alternatively, the video/audio decoder may be omitted, and a more powerful processor can used to decode the compressed video and audio in software.

The transceiver 188 is typically a short-range radio transceiver. It may support any of a number of wireless transmission standards, including Bluetooth/IEEE 802.15, IEEE 802.11, HomeRF/SWAP, HIPERLAN, and OpenAir. Bluetooth/IEEE 802.15, IEEE 802.11-1997, HIPERLAN, OpenAir, and HomeRF/SWAP all support transmission rates in the range of 1 to 2 Mbit/s. IEEE 802.11b supports transmission rates of 5.5 Mbit/s and 11 Mbit/s. HIPERLAN also supports a transmission rate of 24 Mbit/s in an alternative mode. Beyond these currently-supported wireless LAN (WLAN) standards, next-generation WLAN standards promise to support transmission rates of 100 Mbit/s and beyond.

The player may alternatively be connected to the base station by cable, or may utilize a non-radio-frequency wireless transport, such as infrared. IEEE 802.11, for example, optionally utilizes an infrared transport. IrDA also utilizes an infrared transport.

The player may alternatively or additionally contain a mobile telephone transceiver for longer-range communication with a netpage server via a mobile telephone network. If the transceiver supports a third-generation 'always-on' packet-switched connection, then the player may download or stream audio content at will. If the transceiver only supports a circuit-switched connection, then the player may choose to connect (and potentially stream audio content) only when it encounters a hyperlink.

If the player incorporates a longer-range transceiver, then it may act as a netpage base station for wireless netpage pens and other netpage sensing devices.

Assuming a compressed video data rate of 1.2 Mbit/s (e.g. MPEG-1 SIF at 30 Hz), the receiver must support a data rate of at least 1.2 Mbit/s. This is within the capabilities of some of the wireless transmission standards described above. Lower (or higher) data rates can be readily achieved by decreasing (or increasing) frame resolution, frame rate and/or image quality. The netpage network can dynamically recode a compressed video stream to match a particular player's capabilities, if necessary, either at a server or at a base station.

The player is controlled by five buttons, generally indicated by 104. The five buttons are a power button 192, a play button 194, a stop button 196, a rewind button 198 and a fast forward button 200. The buttons are sandwiched between the upper molding 114 and the PCB 118 and act on switches 202, 204, 206, 208 & 210 respectively.

The player is provided with a stand 212 comprising two legs 214 & 216 hinged together at adjacent ends by a pin 218 engaging in alternating sets of cylindrical apertures 220 & 222 in the two wings. The wing 214 is mounted at its other end for rotation on the lower molding 116 by integral pins 224. The wing 216 is mounted at its other end for rotation and sliding on the lower molding 116 by integral pins 226. The pins 226 engage in slots 228 in downward extending rails 230. The slots are long enough to allow the two legs to be laid flat between the two rails. The rails extend from the general plane of the lower molding more than the thickness of the legs so that when folded flat the player rests on the rails not the wings. The slots are not smooth but have a number of protrusions 232 which limit movement of the pins, so that the legs may be placed in one of a number of positions to tilt the player relative to the surface on which it rests.

Figure 11:
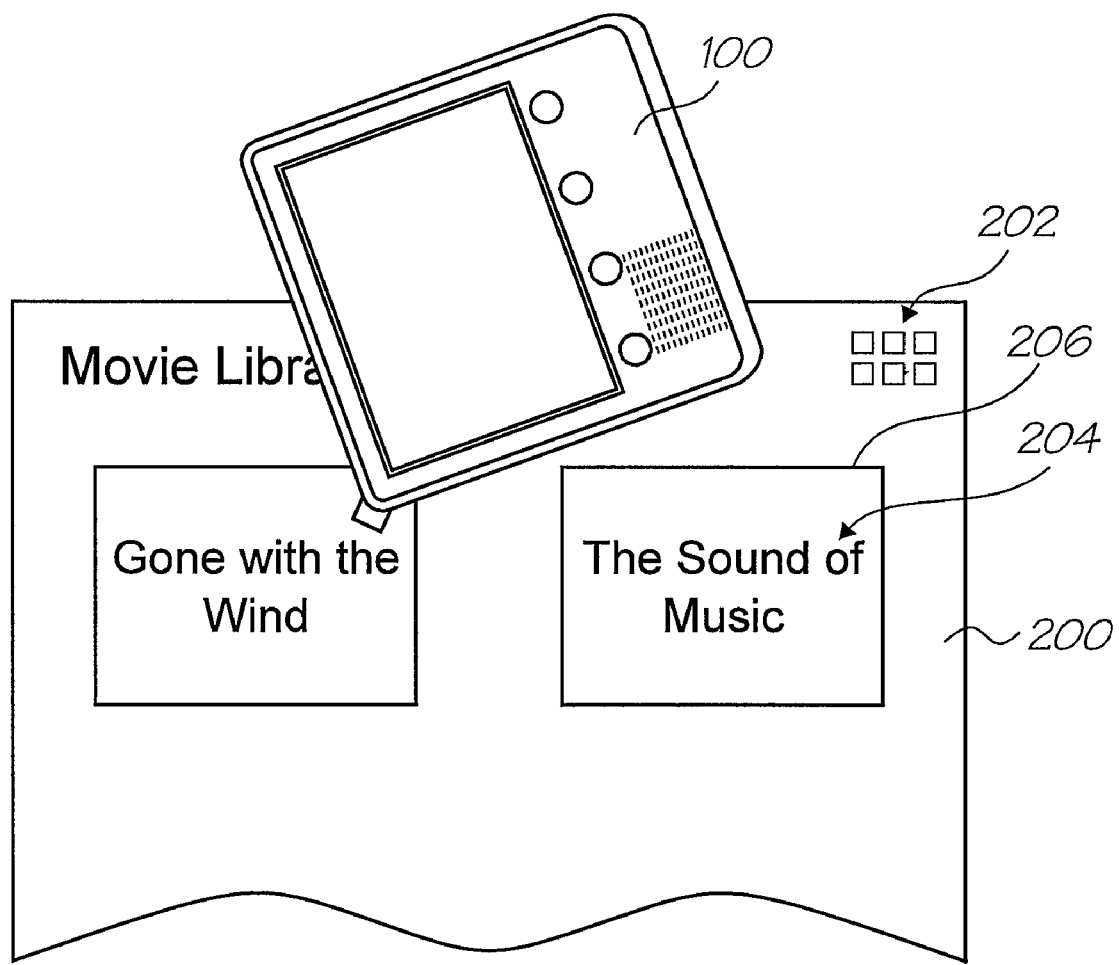
FIG. 11 is a perspective view showing the FIG. 1 player in use on a coded substrate.
Figure 12:
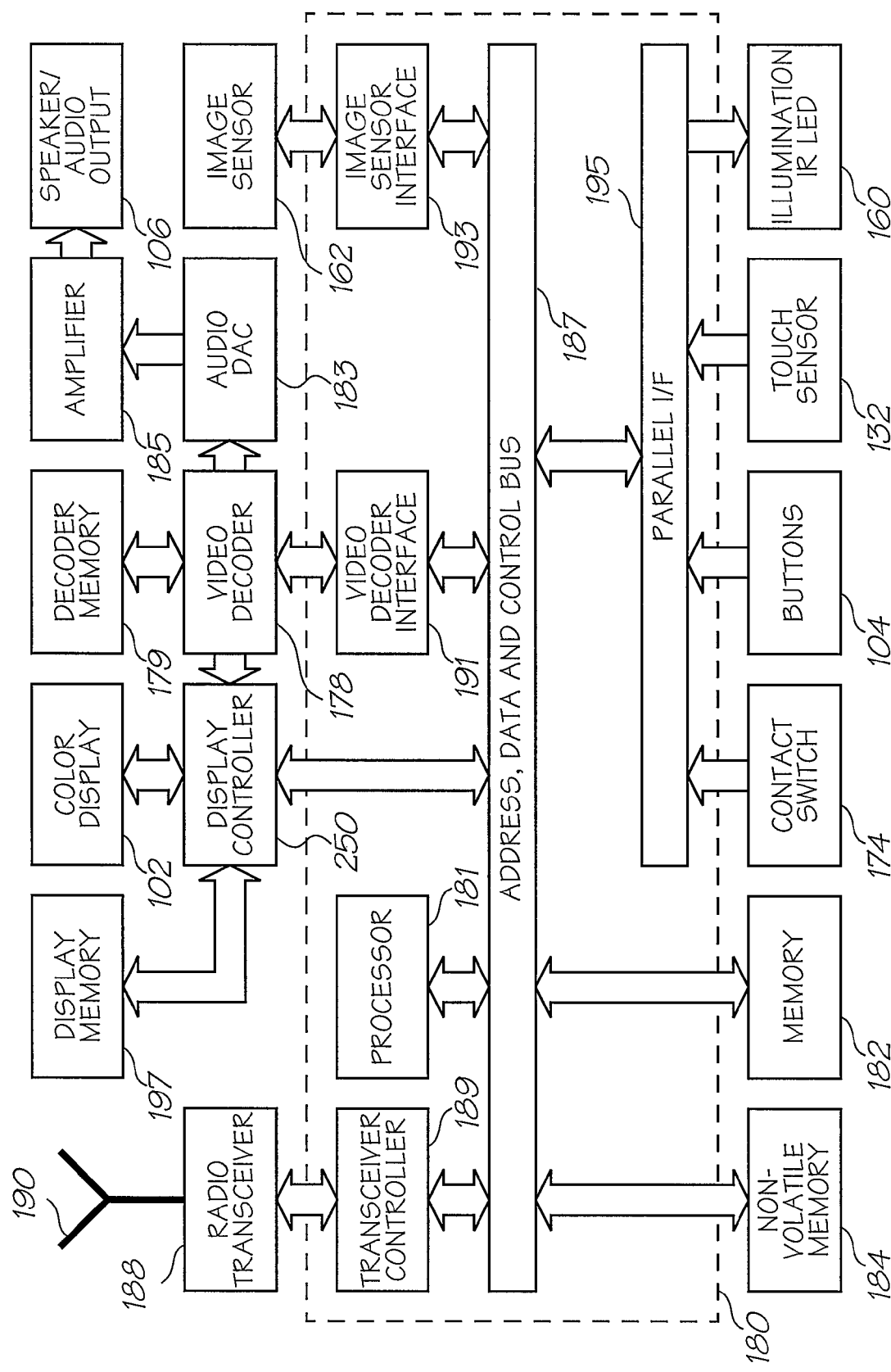
FIG. 12 is a block diagram of the electronics of the player.

Referring to FIG. 11, in use the user has one or more substrates 200 having netpage tags 202 tiled over its surface. For clarity only some of the tags are shown. The substrate 200 may be paper, electronic paper such as used by E-ink Corporation, a plastics sheet or any other suitable substrate. The substrate carries one or more entries of human readable text 204, usually titles of one or more videos available for viewing by the user. The human readable text may optionally include a summary or a small logo or picture 224. The entries themselves may be "active" in that the user may select the entry by selecting the summary or a separate selection "button" may be provided to select the video. The entire page may be tiled with netpage tags or tags may only be provided in "active" areas. To select a video the user merely clicks the sensor device 112 on the relevant "active" area.

The sensor device 112 senses one or more of the tags 202, decodes the coded information and transmits this decoded information to the netpage system. As discussed in our co-pending application U.S. Ser. No. 09/722,142, now issued U.S. Pat. No. 6,965,439, each tag incorporates data which identifies the page it is on and its location within the page. The netpage system is thus capable of determining what video file(s) are associated with the sensed tags and so can extract video file(s) and transmit them to the player for display on the LCD.

Data is preferably compressed in MPEG format and streamed to the player 100. The data is received via the aerial 190 and transceiver 188 and passed to the dedicated MPEG decoder 178 for decoding. The decoded data is then transferred to the display controller 250 for display on the color display 102. Streaming video is buffered in the player's DRAM 182 to eliminate transmission jitter. The size of the required buffer depends on wireless bandwidth contention and contention for the server supplying the streaming data.

Control of the video playback is via the control buttons 104. When the user presses one of the buttons, the processor 180 determines the function of the button and sends an appropriate instruction to the netpage system. According to the instruction, the system modifies or stops transmission of data to the player.

After a video clip has been selected but before playback has commenced the display may change to display the title and optionally the playing time of the video. Optionally controls such as play, fast forward, rewind stop and pause may be displayed, such that the user may control the player via the screen rather than the dedicated control buttons.

The video player optionally includes a microphone, video camera and a record button. It can then be used to record audio and/or video input, thus providing another kind of netpage input. Recorded input may, for example, be associated with a location on a netpage, in the form of an annotation, by clicking at the location with the video player. Subsequent clicks at the same location using a video player then cause the audio and/or video annotation to be played back. If the surfaces of physical objects are universally netpage-enabled, i.e. tagged with unique netpage tags, then audio and/or video annotations can be placed almost anywhere. Such audio and video annotations may be private or public. When they are private they may only be played back by their author. When they are public they may be played back by anyone.

When incorporating a microphone and video camera, the video player can be configured to act as a wireless telephone or video telephone under the control of a telephony application. Since the player lacks a user interface for dialing numbers, numbers can be selected from a netpage in the manner described in our co-pending application U.S. Ser. No. 09/721, 895.

A video clip may be associated with a netpage in the form of a hyperlink, in which case activation of the hyperlink by the video player is ultimately handled by an application whose responsibility it becomes to provide the video clip to the player. A video clip may also be logically embedded as a video clip object in a page description, in which case clip activation is ultimately handled by the page server which holds the page description. Any click in the zone of the video clip object is interpreted by the page server as video clip activation. In either case the actual video clip may be stored on a separate remote server, which may become involved in the streaming playback or download of the video clip.

The video player can download a video clip activated by the user into its internal memory before making it available for playback, or it can stream the video clip on demand from the remote server in response to the user interacting with the player's playback controls. The player may also include non-volatile storage, such as flash memory, magnetic disk, CD writer or CD rewriter for storage of downloaded video data. The schemes outlined in our co-pending application U.S. Ser. No. 09/722,087, now issued U.S. Pat. No. 6,788,982, regarding storage of downloaded data and device identity may be used for storage of video data.

The player typically incorporates power management. After a period of inactivity the player may inactivate the status display. After a longer period of inactivity the processor may enter a power-conserving quiescent state. Power management may be coupled with the tag sensor micro switch, allowing wake-up on page interaction. The player may also incorporate an accelerometer for this purpose.

Whilst the invention has been described with reference to the netpage system which uses invisible tags, the invention is not limited to the netpage system or the use of invisible tags. If desired, the invention may utilize tags or codes which are visible to the average unaided human eye, such as bar codes. The tags need not merely encode an identity which is then used to look up the relevant files. The tags may encode instructions at a higher level. For example a tag may encode an instruction of "play chapter 99". If invisible tags are used they need not be limited to the tags disclosed in relation to the netpage system. Other tagging systems are available and any suitable tagging system may be used. The invention is not limited to the use of inks which absorb certain wavelengths or fluoresce certain wavelengths. Magnetic inks, surface modification, including apertures, modification of the structure of the substrate itself all fall within the scope of the invention. The systems and methods to link the audio player of the present invention and the source of the audio files are not limited to netpage systems. A video player may be linked by a cable to a single computer, rather than a network of computers.

The present invention has been described with reference to a preferred embodiment and number of specific alternative embodiments. However, it will be appreciated by those skilled in the relevant fields that a number of other embodiments, differing from those specifically described, will also fall within the spirit and scope of the present invention. Accordingly, it will be understood that the invention is not intended to be limited to the specific embodiments described in the present specification, including documents incorporated by cross-reference as appropriate. The scope of the invention is only limited by the attached claims.

The invention claimed is:

1. A method of enabling recorded video to be associated with a position on a surface, said surface having coded data printed thereon, said coded data being indicative of a plurality of locations on the surface, said method comprising the steps of:
    interacting with the surface using a handheld video player incorporating an optical sensor for reading the coded data and a video camera for recording video;
    reading at least some of the coded data;
    initiating recording of video by actuating a button on the handheld video player;
    determining a position of the handheld video player using the read coded data; and
    communicating, to a computer system, position data indicative of the position of the handheld video player and video data corresponding to said recorded video, thereby enabling said computer system to associate said video data with said position.

2. The method of claim 1, wherein said computer system is remote from said handheld video player.

3. The method of claim 1, wherein said position data and said video data are transmitted to said computer system via wireless communication.

4. The method of claim 1, wherein said handheld video player is an optically imaging pen.

5. The method of claim 1, wherein said handheld video player comprises a marking nib.

6. The method of claim 5, wherein said interaction is with a zone of said surface, and said method further comprises the step of:
marking said zone using said marking nib during interaction with said zone.

7. The method of claim 6, wherein said marking identifies said recorded video.

8. The method of claim 1, wherein said handheld video player comprises a display for video playback.

9. The method of claim 8, further comprising the step of:
playing back said recorded video.

10. The method of claim 9, wherein playing back said recorded video comprises the steps of:
interacting with said surface using said optical handheld video player;
reading at least some of the coded data;
determining a position of the handheld video player using the read coded data;
communicating position data to the computer system;
receiving video data associated with said position from said computer system; and
playing the video data.

11. The method of claim 10, wherein the interaction is with a zone of the surface, said zone comprising a user-written mark identifying said recorded video.

12. The method of claim 1, wherein the computer system stores in a memory the association between the position and the video data.

13. The method of claim 1, wherein said coded data is indicative of an identity of the surface, and said method comprises the step of:
communicating, to the computer system, identity data indicative of the identity of the surface.

14. The method as claimed in claim 1, wherein said coded data is printed as a plurality of tags, each tag identifying the identity of the surface and the location of the tag on the surface.

15. A system for enabling recorded video to be associated with a position on a surface, said system comprising:
a surface having coded data printed thereon, said coded data being indicative of a plurality of locations on the surface; and
an optical sensing device for interacting with the surface, said sensing device comprising:
a video camera for recording video;
an image sensor for reading at least some of the coded data during interaction with the surface
a processor for determining a position of the sensing device using the read coded data; and
means for communicating, to a computer system, position data indicative of the position of the sensing device and video data corresponding to said recorded video, thereby enabling said computer system to associate said video data with said position.

16. The system of claim 15, further comprising the computer system, wherein the computer system is configured for:
receiving the position data and the video data from the sensing device; and
storing, in a memory, an association between the video data and the position.

17. An optical sensing device for interacting with a surface and enabling recorded video to be associated with a position on the surface, said surface having coded data printed thereon, said coded data being indicative of a plurality of locations on the surface, said sensing device comprising:
a video camera for recording video;
an image sensor for reading at least some of the coded data during interaction with the surface;
a processor for determining a position of the sensing device using the read coded data; and
means for communicating, to a computer system, position data indicative of the position of the sensing device and video data corresponding to said recorded video, thereby enabling said computer system to associate said video data with said position.

18. The sensing device of claim 17, wherein said sensing device is a pen comprising a marking nib.

19. The sensing device of claim 18, further comprising a display for video playback.

* * * * *